United States Patent [19]

Kardas

[11] Patent Number: 4,768,345
[45] Date of Patent: Sep. 6, 1988

[54] CONTINUOUS THERMAL ENERGY DELIVERY FROM A PERIODICALLY ACTIVE ENERGY SOURCE

[75] Inventor: Alan Kardas, Chicago, Ill.

[73] Assignee: Institute of Gas Technology, Chicago, Ill.

[21] Appl. No.: 78,824

[22] Filed: Jul. 28, 1987

Related U.S. Application Data

[63] Continuation-in-part of Ser. No. 914,779, Oct. 3, 1986, abandoned.

[51] Int. Cl.$^4$ ............................................... F03G 7/02
[52] U.S. Cl. .................................. 60/641.15; 60/659; 126/400; 126/436; 165/104.17
[58] Field of Search .................. 60/641.8, 641.15, 659; 126/400, 419, 436; 244/173; 165/104.17, 104.21

[56] References Cited

U.S. PATENT DOCUMENTS

| | | | |
|---|---|---|---|
| 3,548,930 | 12/1970 | Byrd | 165/104.26 |
| 3,903,699 | 9/1975 | Davis | 60/641.5 |
| 4,091,622 | 5/1978 | Marchesi | 60/659 X |
| 4,172,491 | 10/1979 | Rice | 165/1 |
| 4,304,218 | 12/1981 | Karlsson | 126/419 |
| 4,469,088 | 9/1984 | Anzai et al. | 126/436 |

Primary Examiner—Stephen F. Husar
Attorney, Agent, or Firm—Thomas W. Speckman; Ann W. Speckman

[57] ABSTRACT

Continuous thermal energy delivery from a cyclically active thermal energy source having an ON period substantially exceeding an OFF period by passing working fluid through a central working fluid conduit passing through a containment means forming an annular chamber therewith, the annular chamber substantially filled with a liquid-solid phase change thermal energy storage material having a high specific heat in the liquid phase. During insolation, thermal energy superheats the thermal energy storage material and is conducted therethrough to heat the working fluid. During eclipse the superheated thermal energy storage material transmits heat to the working fluid and formation of solid phase of the thermal energy storage material releases heat of fusion adjacent the working fluid conduit for additional supply of heat to the working fluid. A thermal gradient is maintained across the thickness of the thermal energy storage material.

20 Claims, 2 Drawing Sheets

CONTINUOUS THERMAL ENERGY DELIVERY FROM A PERIODICALLY ACTIVE ENERGY SOURCE

CROSS REFERENCE TO RELATED APPLICATION

This application is a continuation-in-part application of my earlier copending application Ser. No. 914,779, filed Oct. 3, 1986, now abandoned.

BACKGROUND OF THE INVENTION

1. Field of the Invention

This invention relates to a process and apparatus providing continuous and relatively constant level thermal energy delivery from a periodically active energy source such as solar energy in space applications. The present invention provides the energy supply sector for a power generating sector comprising a power generation means, such as a turbine, a condenser, a pump, and a reheater. The two sectors combine to form a continuously operating working fluid loop to provide continuous delivery of power while the solar energy source is regularly intermittent. The energy supply sector of this invention is intended for use with dynamic solar power systems for orbiting space stations. It acquires solar energy during insolation, transmits it by conductance, buffers the incoming temperature wave, stores some of the acquired energy to be delivered during eclipse, but continuously delivers a supply of working fluid at a relatively constant temperature for an energy utilization sector which may employ a power generation means, such as a turbine.

2. Description of the Prior Art

Utilization of solar energy to power orbiting space stations is desirable since solar energy is available at useful intensities and with cyclic regularity. However, since periods of insolation are regularly followed by periods of eclipse, utilization of this energy in a continuous manner conventionally requires storage of energy during periods of insolation and its release during periods of eclipse. For instance, a solar dynamic power system may comprise a solar collector in which the engine's working fluid is heated during insolation to a level in excess of that needed at the engine inlet. It is then passed through a regenerator in which some of the acquired energy is stored while the temperature of the passing fluid is lowered to that required at the engine's inlet. As the eclipse begins, this stream is shut off, and the cold fluid returning from the engine is passed through the regenerator which heats it to the level required by the engine. At the end of the eclipse the cycle is repeated. Another conventional method for providing continuous thermal energy delivery to a working fluid from a periodically active energy source exposes the working fluid directly to the energy source during insolation, while at the same time charging separate solar energy collectors comprising thermal energy storage material. During eclipse, working fluid is passed in heat exchange relationship with thermal energy storage material, recovering the thermal energy stored during insolation. Both methods require switching of streams and both must rely upon excess regenerator mass to damp out the undesirable temperature fluctuations of the working fluid during the cycle. Solar energy may be transferred to the thermal energy storage material either directly by means of a receiver/concentrator, or by introducing a second fluid requiring a second loop, if the thermal energy storage medium is separate and at some distance from the receiver.

Another way to accomplish the desired energy transfers is to provide two fluids alternately occupying the same space. A first, thermal energy carrying fluid yields its thermal energy to a thermal energy storage matrix, and a second, the engine working fluid, recovers heat stored in the thermal energy storage matrix. Relatively continuous delivery of the second fluid may be approached by operating several regenerative units and substituting the fluid flows at appropriate cyclic intervals. It is difficult, however, to provide working fluid to a power generation means at a constant working temperature with multiple stream switchings.

A continuous supply of relatively constant temperature working media may be approached in conventional stationary applications by using a large mass of thermal energy storage matrix having a large thermal inertia which is only slightly affected by passage of a thermal energy carrying and a thermal energy retrieval or working fluid. This approach is impractical for use in orbiting space stations due to large space and mass requirements.

Phase change thermal energy storage media are known wherein thermal energy storage and release are accomplished utilizing the heat of fusion of the phase change storage material, in addition to utilizing the sensible heat. Such media are capable of storing and releasing more heat energy per unit mass than energy media not undergoing a phase change during their operating cycle. Solar energy absorbed by a suitable phase change thermal energy storage material during insolation may convert some or all of such material from solid to liquid phase. Energy stored may then be released as the latent heat of solidification during solar eclipse as the material is converted from a liquid to a solid state due to temperature decreases. Solid-liquid-solid phase change thermal energy storage media having various latent heats of fusion are well known for use in both residential and industrial applications on Earth.

Solar collectors with a double tube structure are known in which thermal energy storage material changeable from a solid phase to a liquid phase is enclosed in the space between the inner tube and the outer tube with heat transfer fluid introduced through the inner tube, and with solar energy supplied from trough concentrators to the outer tube. Such collectors are exemplified by U.S. Pat. No. 4,469,088 which teaches a round outer tube and a fluted inner tube in contact with the outer tube at the peaks of the flutes for transfer of thermal energy between the inner and outer tube. Such collectors dampen abrupt temperature changes in the heat transfer fluid flowing through the inner tube. Such systems cannot be used for simultaneous energy storage due to long night periods here on Earth, and because of unpredictability of weather changes the system cannot be programmed to deliver a requisite amount of energy to a power generating system. As a result of the partial direct contact of the inner and outer tubes intended to heat the heat transfer fluid without passing through the thermal energy storage material, fluid flowing through the inner tube would be subject to little temperature wave damping in orbital applications and would be prone to exhibit unacceptably large temperature variations at the turbine inlet.

Invariably, conventional art teaches splitting off a portion of the energy stream available during insolation and storing it in a separate thermal energy storage device from which the energy is extracted to be used during eclipse periods.

U.S. Pat. No. 3,903,699 teaches a solar energy power system for space orbital use wherein a low boiling temperature fluid is vaporized in a solar boiler during insolation and used to operate a turbine. A portion of the heat is stored in a phase change material and used to supply heat to generator vapor during eclipse.

U.S. Pat. No. 4,091,622 teaches absorption of solar energy by a collector and its transference by means of suitable piping for storage. When the stored heat is to be later used, as in the nighttime or on overcast days, a switching device uncouples the collector from the storage structure and couples the storage structure to the boiler.

The problem of reducing heat losses from the thermal energy storage material during periods when the solar source is not active is conventionally treated by shielding. U.S. Pat. No. 4,304,218 teaches the use of elongated parabolic reflectors, hinged, and movable in a manner to completely cover the heat receiver tubes filled with a heat collecting medium when a non-active period or cloudiness supervenes.

Other methods are known for maintaining constant temperature conditions for space equipment. U.S. Pat. No. 3,548,930 teaches an isothermal cover to maintain constant temperature conditions for space equipment when the cover is exposed to variable temperature conditions. The isothermal cover is a double-walled shell with containers of phase change material mounted on struts inside, the phase change material absorbing, storing and releasing heat energy, utilizes the heat pipe principle to equalize temperature circumferentially and to conduct heat radially to the inner core. The purpose of the device of this patent is to provide isothermal environment for sensitive instruments or the like by absorbing, holding, and redistributing the incoming thermal energy rather than to serve as a continuous energy source for a designated use, as by a shaft power generator.

SUMMARY OF THE INVENTION

It is an object of the present invention to provide continuous and relatively constant level thermal energy delivery from a periodically active energy source.

It is another object of the present invention to provide continuous delivery of relatively constant temperature working fluid for power generation means in dynamic solar power systems which are especially suitable for use in orbiting space stations.

It is yet another object of the present invention to provide continuous delivery of relatively constant temperature working fluid from a solar energy source exhibiting relatively short cycles with insolation periods longer than eclipse periods.

It is yet another object of the present invention to provide continuous delivery of relatively constant temperature working fluid by continuously circulating working fluid in a single loop comprising an energy acquisition, storage, and delivery sector and a power generation sector.

It is another object of this invention to provide an energy acquisition, storage and delivery sector comprising a central passageway carrying working fluid and an annular conduit holding liquid-solid phase change thermal energy storage material.

It is yet another object of the present invention to avoid the use of separately branched-off thermal energy holding devices with interruptible on-off switching serving to feed power generators when the solar source is inactive.

It is yet another object of this invention to avoid the necessity of mechanical shielding or isothermal covering not integral with the main mass of the heat transmission, storage and delivery material.

The present invention relates to the energy acquisition, storage and delivery sector of a single continuously operating working fluid loop whose power sector may comprise a turbine, a condenser, a pump and a preheater. According to the present invention, continuous delivery of relatively constant temperature working fluid suitable for use in compact, lightweight power generation means is obtained from an intermittent solar energy source having short periods of insolation and eclipse, as compared to those exprienced on the surface of the Earth, for example, about 50 to 70 minutes and about 30 to 40 minutes, respectively. Commonly used insolation and eclipse times used in connection with possible space stations are 59 and 34 minutes. Working fluid may be passed continuously in a single loop to a thermal energy utilization sector, comprising a thermal energy utilization means, such as a power generation means, at an elevated temperature, yield thermal energy to the thermal energy utilization means, and exiting at a significantly reduced temperature traverse an energy recovery sector wherein it is heated for reintroduction into the thermal energy utilization sector. According to the present invention, working fluid is continuously circulated through the energy recovery sector in the central chamber of a conduit having a double-walled configuration. The annular chamber formed between the double walls is substantially filled with a liquid-solid phase change thermal energy storage material having a high specific heat in the liquid phase making it capable of transmitting high levels of thermal energy radially inwardly to heat the working fluid and storing thermal energy during insolation. The liquid stored thermal energy is transferred radially inwardly to the working fluid during eclipse together with the latent heat of fusion released by formation of solid phase along the inner wall to provide a continuous supply of relatively constant temperature working fluid. Use of a liquid-solid phase change thermal energy storage and transmission medium in accordance with the present invention acts as a temperature rectifier damping periodic large amplitude temperature swings experienced by the collector surfaces. It is desired that the solid phase front remain close to the working fluid or heat sink thermal transfer zone to prevent formation of a thermal transfer barrier between the heat source and the working fluid.

The outer wall containing the thermal energy storage material is exposed to solar energy during insolation and is capable of transmitting thermal energy radially inwardly to the phase change thermal energy storage material contained in the annular chamber. The outer wall, or collector surface, may but need not be protected from thermal losses to space during eclipse in a conventional manner. For example, when straight trough-type solar concentrations are used, they may be hinged to close or may have a moving cover to open or close exposure as desired.

The thickness of the annular chamber containing the phase change thermal energy storage material, the type of phase change material utilized, the diameter of the working fluid chamber, and the length of the energy recovery sector are parameters which vary depending upon the energy requirements of specific systems and properties of the specific working fluid and thermal energy storage material. The thermal energy storage material preferably has a high thermal conductivity in the liquid phase providing high heat flow rate radially across the energy storage material to the working fluid circulating in the central chamber of the conduit during insolation, while providing storage of sufficient thermal energy as latent heat of fusion and as sensible heat of the liquid phase change material to provide thermal energy for continuous delivery of relatively constant temperature working fluid during eclipse. Preferred phase change thermal energy storage materials for use in the present invention have a high specific heat in the liquid phase so that a considerable amount of thermal energy may be stored as sensible heat in the liquid phase of the thermal energy storage material. During eclipse of the solar energy source, the thermal energy storage material transmits stored energy from the superheated liquid phase at the outer radius of the annulus to the interface of the solid phase at the inner radius of the annulus where the thermal energy may melt the solid phase change material or may be transferred across a thin solid phase along the outer surface of the inner wall to the working fluid. In a preferred embodiment, the liquid-solid phase change front does not migrate far from the inner wall of the annular chamber so that the fraction of phase change thermal energy storage material in the solid phase is relatively small at all times during the cycle to reduce impedance of the heat flow across the solid thermal energy storage material to the working fluid in the central chamber of the conduit. A temperature differential is maintained across the thickness of the thermal storage material in both the insolation and eclipse mode.

Given the duration of the orbital cycle and the durations of its insolation/eclipse periods, the design of the apparatus and the operation of the process of this invention depend upon the thermal energy input requirements of the power sector, such as a turbine, the specification of the temperature level of the incoming working fluid, and the admissible temperature variations at the turbine entry, and the temperature level of the liquid working fluid entering the energy acquisition, storage, and delivery sector from the preheater.

Given the exigencies of orbital applications, such as minimal weight and increased reliability achieved by a small number of active components, according to this invention the required mass m of a given thermal energy storage material with an average effective specific heat (including the heat of fusion), $c_{ps}$, needed to continuously transmit, store and deliver thermal energy to a power sector, such as a turbine, at a rate of $\dot{Q}$ (Btu/h; kW) is defined by the heat delivered during the eclipse period of duration $P_{ecl}$ (hr; sec) as the average temperature of the heat storage material is lowered by the amount $\Delta t$ (deg F; K):

$$\dot{Q} \, P_{ecl} = m \, c_{ps} \, \Delta t \qquad \text{Equation I}$$

It is not apparent as to whether the value m thus defined be sufficient for use in the present invention since the heat storage mass m must also transmit the acquired energy continuously to the working fluid as well as cover some loss to the space ambience during the eclipse.

According to this invention, the thermal storage material mass m must be disposed in an annular space in the energy acquisition, storage and delivery sector of the working fluid loop. The storage material's mass thus defines the annular volume. The width of the annulus is not arbitrary, but must conform to the strictures of the maximum allowable temperature swing of the working fluid at the turbine entrance. The width is therefore important in damping the impressed temperature wave and may be estimated from the given damping factor F which is the ratio of the amplitude of the working fluid at the turbine entry to the amplitude of the temperature swing to which the outer radius, the heat acquisition surface of the annulus, is subjected:

$$F = \exp\left(-\Delta r \cdot \sqrt{\frac{\pi \, c_{ps} \rho_s}{k_s \cdot \tau_0}}\right) \qquad \text{Equation II}$$

where the expression multiplying the annular width $\Delta r$ represents a wave number, calculated from $c_{ps}$, the material density $\rho_s$, average material thermal conductivity $k_s$, and the duration of the cycle, $\tau_0$. Solving Equation II for $\Delta r$ yields an estimate of the annular thickness which will damp out the incoming temperature wave to the extent prescribed by the factor F. It is not apparent as to whether the requisite annular width $\Delta r$ will not inhibit the direct flow of thermal energy from the acquisition surface of the annulus, across the energy storage material, and to the working fluid, during the insolation period, for the ability of a concentric layer of a heat-conducting substance to conduct heat from its outer to its inner surface is known to be proportional to $$\left[\frac{k_s}{\ln\left(1 + \dfrac{\Delta r}{r_{ins}}\right)}\right]$$

and this ability is lessened as the width $\Delta r$ is increased. The value of the inside radius $r_{ins}$ is chosen from considerations relating to the power generating sector of the loop, the pump characteristics, and the heat transfer coefficient between the working fluid and the closed tubular surface containing it.

The length of the energy acquisition, storage, and delivery branch, L, may be computed from $r_{ins}$, $\Delta r$, and the annular volume determined from the requisite mass of the heat storage material and its average density.

BRIEF DESCRIPTION OF THE DRAWINGS

The above mentioned and other features and advantages of this invention and the manner of obtaining them will become more apparent and the invention itself will be best understood by reference to the following description of preferred embodiments taken in conjunction with the accompanying drawings, in which.

DESCRIPTION OF PREFERRED EMBODIMENTS

Figure 1:
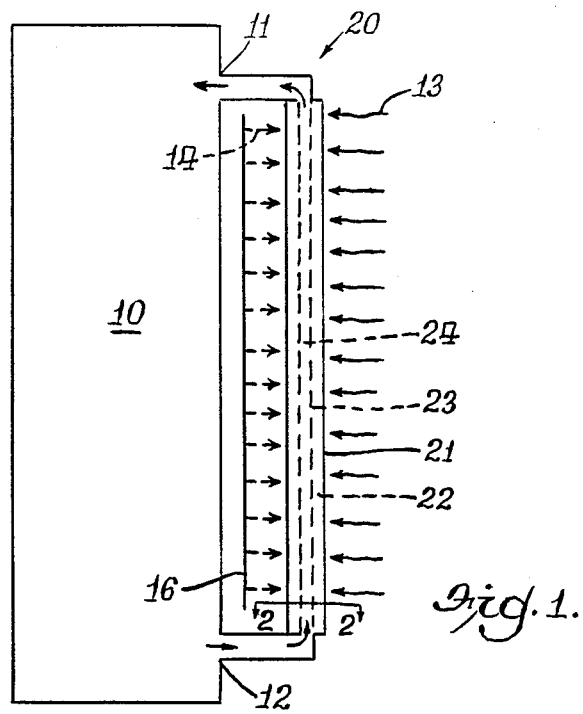
FIG. 1 is a highly schematic representation of a power generation system utilizing one embodiment of this invention.
Figure 2:
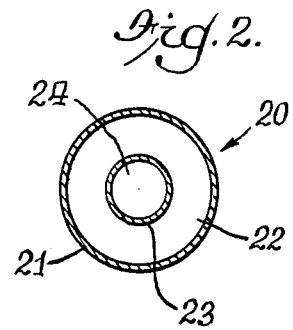
FIG. 2 is a cross-sectional view taken along line 2—2 of FIG. 1.

As shown schematically in FIG. 1, a single working fluid loop circuit comprises thermal energy delivery means 20 for thermally charging working fluid which delivers continuous and relatively constant level thermal energy to thermal energy utilization means 10. Power generation means such as turbines operating, for example, on an Organic Rankine Cycle, are preferred for use with the continuous thermal energy delivery system of the present invention. Other types of thermal energy utilization means which require a continuous and relatively constant level thermal energy working fluid are also suitable for use with the thermal energy delivery means of the present invention. Working fluid of relatively constant thermal level may be introduced into thermal energy utilization means 10 at inlet 11, traverse the thermal energy utilization means in thermal energy transfer relation therewith to provide thermal energy to the thermal energy utilization means and exit at outlet 12 at a reduced temperature. The working fluid then enters an energy recovery zone comprising thermal energy delivery means 20, wherein the working fluid is thermally charged to the desired upper temperature level for reintroduction to inlet 11 of thermal energy utilization means 10. This provides a single loop, continuous flow system.

Thermal energy delivery means 20 preferably comprises a double-walled tubular configuration, or the like, providing a central chamber 24 delimited by inner wall 23 for conveyance of working fluid of the thermal energy utilization means. Annular chamber 22 between inner wall 23 and outer wall 21 contains liquid-solid phase change thermal energy storage material. While outer wall 21 and inner wall 23 are shown as concentric tubes, it will be recognized that other configurations, such as finned tubes, tubes having undulating surfaces to increase the effective surface area, and the like, may be adapted for use in the energy delivery means of the present invention. However, the outer wall and inner wall should be separated to provide annular chamber 22 filled with phase change material and to induce a desired temperature differential across the thickness of the phase change material. Outer walls may be adapted to solar concentrator design. For example, in cases where a concentrator's thermal radiation field is circumferentially non-uniform, the outer wall may have a matched cross section shape of a cardioid, the cusp portion having more surface area per unit central angle for utilization of higher thermal energy from the higher thermal energy portion of the concentrated field. Likewise, to optimize circumferentially non-uniform concentrated thermal radiation fields, arc portions of the outer wall may be concave to match the non-uniform thermal radiation field. Another manner of optimization of the system may be to have a spiral of the double walled tube placed in the focus of a round parabolic reflector which may have a quartz collector lens. Generally round cross section tubular shapes are preferred to provide uniformly increasing volumes toward the outer wall 21 to accommodate relatively larger volumes of higher temperature thermal energy containing liquid to keep the solid phase at a relatively small thickness along inner wall 23. Thermal energy delivery means 20 continuously delivers thermal energy to working fluid traversing the energy recovery zone between thermal energy utilization means outlet 12 and inlet 11, providing relatively constant higher temperature working fluid to thermal energy utilization means 10. While the cross section shape of inner wall 23 and outer wall 21 is generally round, tubes forming these walls may be any cross section shape such as oval or polygonal or conform to reflector properties as noted above. Tubes forming inner wall 23 and outer wall 21 may be constructed of the same or different materials and may comprise laminated or coated materials to enhance desired functions at the particular thermal exchange surface. Tubes forming inner wall 23 and outer wall 21 are generally metallic and have high thermal conductivity such as about 15 to about 30 Btu/hft°F.

Liquid-solid phase change thermal energy storage material in annular chamber 22 is capable of transmitting heat radially inwardly to working fluid in central chamber 24 and storing heat during insolation, and releasing stored heat to the working fluid during eclipse of the solar energy source. Preferred phase change thermal energy storage materials for use in annular chamber 22 have a high specific heat in the liquid phase of above about 0.6 Btu/lb°F., most preferably about 0.6 to about 0.8 Btu/lb°F., to provide storage of a substantial amount of sensible thermal energy in the liquid phase, a high thermal conductivity of above about 1 Btu/hft°F., most preferably about 1 to about 5 Btu/hft°F., to provide a high heat flow rate radially inward to the central chamber, and a high heat of fusion to provide high quantities of thermal energy upon liquid to solid phase change, suitably above about 300 Btu/lb, most preferably about 350 to about 450 Btu/lb. In preferred embodiments, the phase change front of the solid phase of the phase change thermal energy storage material does not migrate far from the surface of inner wall 23, so that the solid phase fraction represents a small volume which does not offer significant impedance to heat flow across inner wall 23 to the working fluid. Phase change thermal energy storage materials, such as lithium hydroxide (LiOH), lithium fluoride (LiF), and other simple and double salts are suitable for use in the present invention and are well known to the art. Lithium hydroxide is preferred for most applications. Materials having higher temperature or lower temperature properties may be used. For example, a Brayton-cycle engine could be operated on a mixture of helium and xenon entering at about 1500° F. with silicon phase change thermal energy storage and transmission material having a melting point at 2570° F., heat of fusion of 774 Btu/lb and conductivity of 14 Btu/hft°F. However, use of silicon may be currently limited by available containment materials. Lower temperature materials may be used, such as a mixture of 35 $LiKCO_3$-64$K_2CO_3$ having a melting point of 941° F. or $NaNO_3$-MgO having a melting point of 584° F. The phase change temperature is chosen to be higher than the highest desired working fluid temperature by an amount providing desired thermal transfer in the size and configuration of apparatus used. This temperature depends upon the thermal storage and conduction capabilities of the phase change material and is in the case of lithium hydroxide in the device as described in the example about 90° F. Temperature swings of the working fluid sufficiently large are necessary to obtain the temperature potential necessary to drive the thermal energy transfer in a device of reasonable size while being small enough to provide working fluid of sufficiently constant temperature to satisfactorily operate the thermal mechanism used, about 50° to about 70° F. in the case of turbines. Generally, temperature swings of the working fluid are less than about 10 to 15 percent. Outer wall 21 is directly exposed to the solar energy source during insolation and may, but need not be protected from energy losses to space by transfer of thermal energy across outer wall 21 during eclipse. Reflector 16 may also be used to direct reflected solar energy rays 14 to the back side of outer wall 21 to provide more uniform thermal energy distribution.

In operation, solar energy impinges on outer wall 21 during insolation, and is transmitted radially inwardly to phase change thermal energy storage material in annular chamber 22. The temperature of the liquid phase of phase change material increases storing sensible heat and, as heat is transmitted radially inwardly, the solid phase fraction of phase change material near the surface of inner wall 23 formed by the lower temperature of working fluid in central chamber 24 is reduced or eliminated. The high thermal conductivity of liquid phase change material provides a high heat transfer rate radially inwardly across annular chamber 22 to working fluid in central chamber during insolation. During eclipse, sensible heat stored in the superheated liquid phase of the phase change material is transmitted to the interface of the solid and liquid phases near the surface of inner wall 23. A thin solid layer of phase change material may line inner wall 23 and is at about the freezing/melting temperature near the working fluid outlet end and at an intermediate temperature between the freezing/melting temperature and inner wall 23 temperature toward the working fluid inlet end. The thermal energy passing inwardly through the phase change material may melt the solid phase change material or may be transmitted across relatively thin solid phase and inner wall 23 to working fluid in central chamber 24. In this manner, continuous and relatively level thermal energy delivery provides relatively constant temperature working fluid during both periods of insolation and eclipse.

Multiple thermal energy delivery means according to this invention may be used in series to advantageously provide staged heating or to provide working fluid at multiple temperatures. A series arrangement of thermal energy delivery means may advantageously use different liquid-solid thermal storage materials of increasing liquid-solid phase change temperatures. Multiple thermal energy delivery means according to this invention may be used in parallel with simple manifolds at each end to provide higher quantities of higher temperature working fluid. It is also possible to obtain a continuous supply of a secondary warmed fluid at a lower temperature than the working fluid exit by tapping the working fluid at a desired thermal profile position. Such secondary warmed fluid may be used to keep instruments or similar hardware warm. In a similar fashion, partially preheated working fluid may be fed to the main stream from an auxiliary source.

Additional damping of the temperature wave in the working fluid entering the thermal energy utilization sector may be achieved by a length of the working fluid conduit being insulated from the energy source and surrounded by an annular chamber holding a phase change material possessing a higher heat of fusion and melting temperature closer to the desired temperature of the working fluid entering the energy utilization sector. This phase change material need not possess the high temperature stability required by the phase change material in the energy collection and supply sector. This portion of the annular chamber may be arbitrarily configured and preferably be about 20 to about 40 percent of the length of the energy collection and supply sector.

Necessary fluid transport means, such as pumps or compressors known to the art, may be used as needed to move the fluid through the thermal energy delivery means of this invention and to provide fluid of desired pressure to the thermal utilization means.

Figure 4:
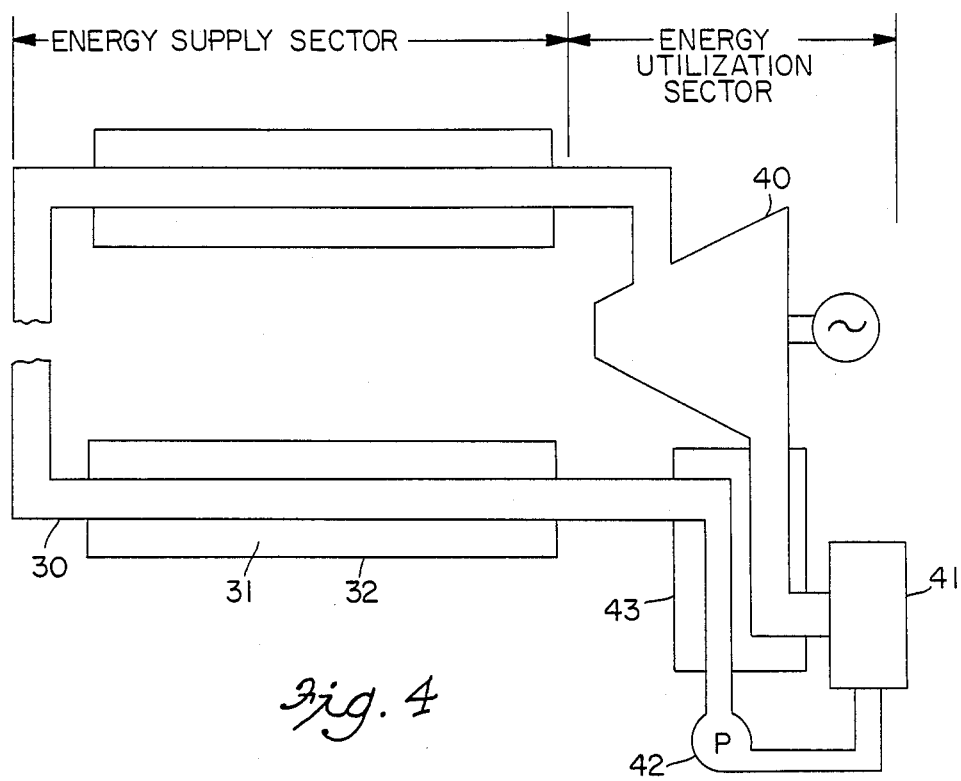
FIG. 4 is a schematic representation of a closed working fluid loop showing the energy acquisition, storage and delivery sector in combination with a turbine condenser, pump and reheater energy utilization sector.

As shown in more detail in FIG. 4, the energy acquiring, storing and delivering sector comprises an inner passageway 30 defined by the inner radius $r_{ins}$ of the annulus, carrying the working fluid in an uninterrupted and unswitched stream, and an annular space 31 of width $\Delta r$ filled with liquid-solid phase change material exhibiting thermal properties required by the specific apparatus and process. These thermal properties are chosen to match the conductance capacity of the radial distance $\Delta r$ to the heat-holding capacity, the specific heat and the heat of fusion of the phase change material. The conductance, the product of the thermal conducitivity $k_s$ and the heat flow path $\Delta r$, controls the flow of energy from collector surface 32 to the working fluid; the product of the effective heat capacity $c_{ps}$ and the material density $\rho_s$ controls the storage of the heat in the mass of the conducting material so that it can continue to flow to the heat sink when the source is not active. This product also controls, in conjunction with $k_s$ and $\Delta r$, the damping of the impressed temperature wave at the working fluid level. Thus, an exceptionally high $k_s$ would yield high heat fluxes to the working fluid during insolation, but it would also transmit to that fluid a large amplitude thermal wave swing which is undesirable at the turbine inlet.

While conceptually, the energy acquisition, storage and delivery sector could be embodied in a single continuous length, since its outer surface must be matched to the foci of solar concentrators, FIG. 4 shows sectioning. In FIG. 4 only the first upstream section including a vaporization section and the last downstream section feeding the turbine inlet are shown.

FIG. 4 shows energy utilization sector comprising turbine 40 operating, for example, on an Organic Rankine Cycle, condenser 41, pump 42 and reheater 43.

In space applications where the insolation time is in the order of 59 minutes and the eclipse time is in the order of 34 minutes, heating of working fluid about 500° F. can be achieved with less than about 15 percent overall temperature variation, that is working fluid temperature increase of about 500°±37° F. can be achieved with toluene working fluid and lithium hydroxide phase change material. Various working fluids of differing boiling points may be matched to the desired temperature and pressure characteristics of the system. The selection of working fluids is limited by the boiling point at operating pressures and the thermal stability limits of the fluids. For example, boiling points at atmospheric pressure may vary, such as, Freon 12, −21.6° F.; Freon 113, 118° F.; Toluene, 232° F.; monochlorobenzene, 270° F. The upper limits of thermal stability are, for example, 400° F. for Freon 12 and 900° F. for toluene. Suitable workable temperature ranges are coupled with melting/solidification temperatures of the phase change materials and the principles of this invention are applicable to low temperature fluids such as Freon 12 as well as to high temperature molten metals.

The following examples are set forth in detail for the purpose of illustrating the present invention and is not intended to limit the invention in any way.

EXAMPLE I

A mathematical model was designed for a specific embodiment of this invention using an 80 foot long cylindrical annular tube having an inner wall 2 inches inside diameter constructed of steel alloy and an outer wall of 5.5 inches outside diameter and constructed of high temperature steel alloy. The central chamber is filled with toluene as the working fluid continuously circulated at a rate of 0.8 lbs/sec in a single loop circuit energy delivery means between the outlet and inlet of a turbine operating on an Organic Rankine Cycle. The annular chamber contained 1000 pounds of lithium hydroxide (LiOH) liquid-solid phase change thermal energy storage material. The outer conduit is uniformly heated by an equivalent 1800° F. solar source for 59 minutes corresponding to insolation, and then remains perfectly insulated for 34 minutes corresponding to eclipse.

Toluene would exit the turbine outlet at a temperature of 250° F., and must be heated to approximately 735° F., ±30° F., for reintroduction to the turbine inlet. A temperature swing of about 60° F. in the working fluid introduced at the turbine inlet is tolerable, but a larger temperature swing is likely to influence the power output of the turbine.

Figure 3:
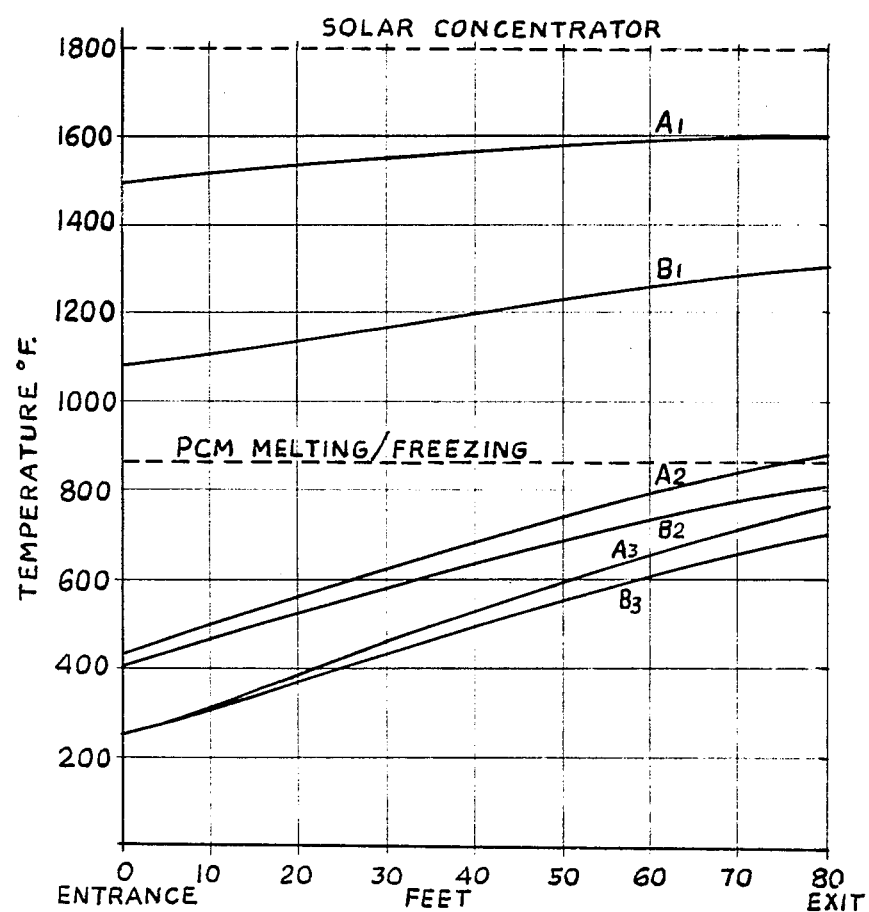
FIG. 3 is a graphic representation of results of Example I.

FIG. 3 shows temperatures along the length of the 80 foot tube as:

| End of 59 Minute Insolation | | End of 34 Minute Eclipse |
|---|---|---|
| $A_1$ | Outer Tube | $B_1$ |
| $A_2$ | Inner Tube | $B_2$ |
| $A_3$ | Working Fluid | $B_3$ |

The curves show a cyclic steady state which is achieved in about five or six cycles from a uniform and cold start.

The mathematical model demonstrated that the 1¾ inch thick annular layer of lithium hydroxide phase change material was capable of conducting, retaining, and releasing thermal energy to heat the working fluid to a relatively constant temperature of about 735° F. during insolation and eclipse without causing more than a 60° F. temperature change in the working fluid at its exit from the continuous thermal energy delivery device of this invention for introduction to a turbine inlet during the entire simulated solar cycle. This represents a continuous supply of about 225 kW of thermal energy to the toluene working fluid.

EXAMPLE II

A more refined numerical model of a preferred embodiment of this invention was written based on general principles of cyclic heat transfer in a cylindrical geometry in order to establish optimal practical limits. The model uses finite-difference techniques to express the governing differential equations, the enthalpy method of calculating the phase changes in the thermal energy storage material, and a convergence technique which arrives at the final cyclical steady state after four to six orbits. A representative result is shown on FIG. 5. It shows the time-temperature behavior during a complete cycle of the solar concentrator source (59 min) and eclipse temperature sink (34 min) as solid line 51; of the outer radius (acquisition/dissipation) annular surface as dotted curve 52 near the turbine entry and as short dashed curve 53 on a length-averaged basis; of a surface in the interior of the mass of the heat storage material at the log-mean radius as short-long dashed curve 54; of the inner radius, the cylindrical surface transferring heat to the working fluid near the turbine entry, as long dashed curve 55; and of the working fluid at the point of entering the turbine as solid curve 56.

Figure 5:
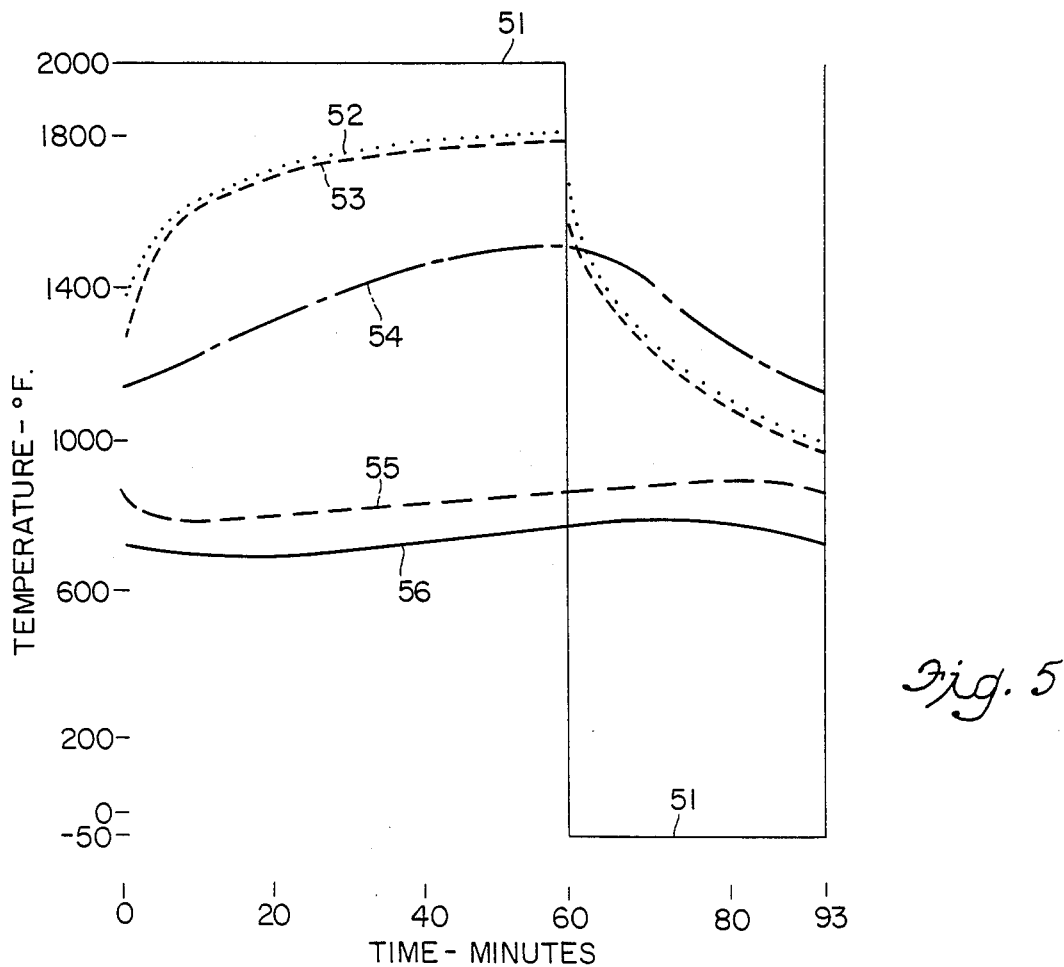
FIG. 5 is a graphic representation of results of Example II.

The calculations to arrive at the curves shown in FIG. 5 were performed using the following conditions: a turbine operating on an Organic Rankine Cycle using toluene as the working fluid, with the fluid entering the turbine at 500 psia and 750+40° F., leaving the turbine at 9 psia and 539° F.; upon condensation, the fluid is pumped through a reheater, entering the energy supply sector as a 450° F. toluene liquid; lithium hydroxide (LiOH) serves as the heat transmission, storage, and delivery phase-change material and is contained in the annular space of the supply sector of the loop between the radii of 1 inch and 3.3 inches, 63 feet long, the total mass of LiOH being 1200 lbs; the working fluid toluene is passed through the inner conduit at a rate of 0.805 lb/sec; an effective "night sky" temperature of −50° F. was assumed for the eclipse period, while the source temperature was calculated from a solar concentrator flux equivalent to a constant 2000° F. source temperature during the insolation period.

FIG. 5 shows the effective damping of the impressed rectangular source/sink thermal wave 51 by the time it reaches the working fluid being supplied to the turbine, Curve 56. The outer layer of phase change material, Curves 52, 53, respond to the source/sink wave in a quasi-exponential fashion, while the inner layer of phase change material which is adjacent the working fluid, Curve 55, exhibits the damping effects of the process and apparatus of this invention. The phase change in the LiOH takes place at 877° F. and accounts for the flat portions of Curve 55. A cylindrical surface within the LiOH, Curve 54, taken at the log-mean radius shows the damping effect of the bulk of the energy storage and transmission material. This surface remains hotter than both the inner and the outer surfaces during the eclipse.

The turbine used in this example rated at 40 kWe, required 174 kW (thermal), an input of about 600,000 Btu/hr. In order to deliver the energy at this rate from storage during a 34 minute eclipse, a mass of 1200 lbs of LiOH with an effective specific heat of 0.8 Btu/lb°F. takes an average temperature drop of 354° F. while the solar source is inactive (Equation I). An integral average of the temperature drop between curves 52 and 55 of about 350° F. confirms the postulate of Equation I. This average temperature drop bears relation to the total amplitude of the temperature swing to which the outer annular surface is subjected during the eclipse period, the maximum temperature limit being set by thermal stability considerations regarding the phase change material contained in the annulus. For LiOH a safe limit was set at 1800° F. The desired toluene temperature of 750° F. sets the base. In order to maintain the requisite heat flux into the fluid, the inner surface temperature at the interface between LiOH and toluene should be 100°–150° F. above the base temperature of 750° F., Curve 55. The minimum point of Curves 52, 53 is somewhat higher than the mean of Curve 55, with a max-to-min amplitude of about 800° F. The exponential or quasi-parabolic nature of Curves 52, 53 resulting from the rectangular (ON-OFF) nature of the source/sink curve 51 yields a mean value approximating one-third of the total swing of 800° F. or 266° F. Adding to this the difference betwen the mean of Curve 55 and the low point of Curves 52, 53, or about 100° F., results in a mean temperature drop of about 366° F. between the two cylindrical surfaces.

The nature of the time-temperature curves shown in FIG. 5 is inherent in the annular geometry of the system and in the ON-Off nature of the impressed temperature wave and is not expected to vary with different inputs. This permits an a priori esimate of the mean temperature drop $\Delta t$ in Equation I. If the damping factor F in Equation II is limited to 0.10–0.12, for instance 90° F. as a maximum amplitude on the toluene temperature swing, while the outer annular surface undergoes an 800° F. change, results in F=90/800 or 0.1125. Entering this value into Equation II, together with $k_s=1$, $c_{ps}=0.8$, $\rho_s=88$, and $\tau_1=(59+34)/60=1.55$, and solving for the annular width, the result is $\Delta r=2.2$ inches (2.3 inches was used in the detailed numerical calculations shown in FIG. 5).

The absorption of the thermal energy supplied by the LiOH to the toluene at the inner annular surface was calculated by a program using standard heat transfer correlations for turbulent fluids in pipes, with the vaporization section treated separately to account for the needed heat of vaporization.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An apparatus for continuous delivery of relatively uniform predetermined thermal energy from a cyclically active thermal energy source having an ON period substantially exceeding an OFF period in duration to an energy utilization sector of a closed working fluid conduit loop additionally comprising an energy supply sector, said energy supply sector comprising:

working fluid conduit means for containment and transport of said working fluid from a lower temperature outlet of a thermal utilization means to a higher temperature inlet of said thermal energy utilization means;

tubular outer containment means spaced from and surrounding at least a portion of said energy supply sector of said working fluid conduit means forming an annular chamber between said working fluid conduit means and said tubular outer containment means;

liquid-solid phase change thermal energy transmission and storage material having a high specific heat in the liquid phase substantially filling said annular chamber;

said annular chamber having a width between said working fluid conduit means and said outer containment means and a length consistent with said continuous delivery of relatively uniform predetermined thermal energy based upon density, heat of fusion, specific heat, and thermal conductivity of said thermal transmission and storage material; and means for protection of said outer containment means from thermal losses during inactivity of said periodically active energy source.

2. An apparatus of claim 1 wherein said width of said annular chamber is determined by the relation:

$$F = \exp\left(-\Delta r \sqrt{\frac{\pi\, c_{ps}\rho_s}{k_s \tau_o}}\right)$$

wherein the damping factor F is a ratio of the maximum admissible cyclic temperature amplitude of said working fluid entering said energy utilization sector, total cycle duration $\tau_o$ in hours, said thermal energy transmission and storage material thermal conductivity $k_s$ (Btu/h ft deg F.), effective specific heat including the heat of fusion $c_{ps}$ (Btu/lb deg F.), density $\rho_s$ (lb/ft$^3$), and said annular width $\Delta r$ (ft).

3. An apparatus of claim 2 wherein the radius of said working fluid conduit is fixed by said energy utilization sector.

4. An apparatus of claim 3 wherein said length of said annular chamber is obtained by dtermination of the required mass of said energy transmission and storage material by the relation:

$$m = \frac{Q\, P_e}{c_{ps}\Delta t}$$

wherein m is the total mass of said energy transmission and storage material, lbs, Q is the rated energy delivery rate to said energy utilization sector by said working fluid, Btu/h, $P_e$ is the duration of the eclipse period, hr., $C_{ps}$ is the effective specific heat as defined in claim 2, $\Delta t$ is the bulk of said material temperature drop during an eclipse period, deg F.

5. An apparatus of claim 1 wherein said working fluid conduit means and said containment means have substantially circular cross sections.

6. An apparatus of claim 1 wherein said liquid-solid phase change thermal energy storage material forms a thin layer of solid phase adjacent said working fluid conduit means.

7. An apparatus of claim 1 wherein said thermal energy storage material has a specific heat in the liquid phase of above about 0.6 Btu/lb°F.

8. An apparatus of claim 1 wherein said thermal energy storage material has a thermal conductivity of above about 1 Btu/hft°F.

9. An apparatus of claim 1 wherein said thermal energy storage material has a heat of fusion of above about 300 Btu/lb.

10. An apparatus of claim 1 wherein said thermal energy storage material has a specific heat in the liquid phase of about 0.6 to about 0.8 Btu/lb°F.; said thermal energy storage material has a thermal conductivity of about 1 to about 5 Btu/hft°F.; and a heat of fusion of about 350 to about 450 Btu/lb.

11. An apparatus of claim 1 wherein said thermal energy storage material is lithium hydroxide.

12. An apparatus of claim 1 wherein said thermal energy utilization means is a turbine power generation means.

13. An apparatus of claim 1 additionally comprising a solar concentrator focused on said containment means.

14. A process for continuous delivery of relatively uniform predetermined thermal energy from a cyclically active thermal energy source having an ON period substantially exceeding an OFF period in duration, said process comprising:

passing working fluid from a lower temperature outlet of a thermal utilization sector of a continuous working fluid conduit loop to a higher temperature inlet to said thermal utilization sector, said working fluid conduit passing through an energy supply sector in the central portion of an outer containment means forming an annular chamber therewith, said annular chamber substantially filled with a liquid-solid phase change thermal energy transmission and storage material having a high specific heat in the liquid phase and having a width and length consistent with said continuous delivery of relatively uniform predetermined thermal energy based upon density, heat of fusion, specific heat, and thermal conductivity of said thermal transmission storage material;

exposing said outer containment means during cyclic insolation to said thermal energy source superheating said thermal energy storage material in the liquid phase to a temperature above said higher temperature inlet to said thermal utilization sector;

passing a portion of thermal energy from said thermal energy transmission and storage material inwardly to heat said working fluid and to reduce solid phase of said thermal energy storage material adjacent said working fluid conduit during cyclic insolation;

optionally but not necessarily covering said containment means during periodic eclipse to reduce loss of thermal energy; and passing a portion of said thermal energy from said thermal energy storage material inwardly to heat said working fluid and further heating said working fluid by release of heat of fusion upon solidification of said thermal energy storage material adjacent said working fluid condiut during eclipse.

15. The process of claim 14 wherein the time of said insolation is about 50 to about 70 minutes and the time of said eclipse is about 25 to about 45 minutes.

16. The process of claim 15 wherein a thermal gradient is maintained across the thickness of said thermal energy storage material.

17. The process of claim 14 wherein a thin layer of said solid phase is formed on said working fluid conduit.

18. The process of claim 14 wherein a solar concentrator focuses thermal energy from said thermal energy source on said containment means.

19. The process of claim 14 wherein said thermal energy storage material has a specific heat in the liquid phase of about 0.6 to about 0.8 Btu/lb°F.; said thermal energy storage material has a thermal conductivity of about 1 to about 5 Btu/hft°F.; and a heat of fusion of about 350 to about 450 Btu/lb.

20. The process of claim 14 wherein said thermal energy storage material is lithium hydroxide.

* * * * *